United States Patent [19]
Caldwell

[11] Patent Number: 5,940,621
[45] Date of Patent: Aug. 17, 1999

[54] LANGUAGE INDEPENDENT OPTIMAL SIZE-BASED STORAGE ALLOCATION

[75] Inventor: Jeffrey B. Caldwell, Sunnyvale, Calif.

[73] Assignee: Hewlett-Packard Company, Palo Alto, Calif.

[21] Appl. No.: 08/589,907

[22] Filed: Jan. 23, 1996

[51] Int. Cl.⁶ .................................................... G06F 9/45
[52] U.S. Cl. ......................................... 395/709; 395/674
[58] Field of Search .................................. 395/674, 709; 711/133, 136, 137

[56] References Cited

U.S. PATENT DOCUMENTS

| | | | |
|---|---|---|---|
| 4,310,883 | 1/1982 | Clifton et al. | 364/200 |
| 4,542,458 | 9/1985 | Kitajima et al. | 395/674 |
| 5,025,367 | 6/1991 | Gurd et al. | 364/200 |
| 5,113,509 | 5/1992 | Pennings et al. | 395/425 |
| 5,247,600 | 9/1993 | Ashcraft et al. | 395/600 |
| 5,347,540 | 9/1994 | Karrick | 375/10 |
| 5,367,637 | 11/1994 | Wei | 395/250 |
| 5,452,440 | 9/1995 | Salsburg | 711/136 |
| 5,530,964 | 6/1996 | Alpert et al. | 395/709 |
| 5,537,573 | 7/1996 | Ware Ete al. | 711/137 |
| 5,546,559 | 8/1996 | Kyushima et al. | 711/133 |

OTHER PUBLICATIONS

Item #351, Derwent WPI Account No. 87–0077601/11.
Eisenbeis et al., Institut National de Recherche en Informatique et en Automatique, Jul. 1990, No. 1262, "A Strategy for Array Management in Local Memory".
Oldehoeft et al., Communications of the ACM, May 1985, vol. 28, No. 5, "Adaptive Exact–Fit Storage Management".

*Primary Examiner*—Majid A. Banankhah

[57] ABSTRACT

Compiler performance is improved without compromising program correctness by altering the commonly expected ordering that has been used in the past. A more efficient memory image is provided which results in smaller stack frames (activation records), less required heap space (static data memory storage), improved variable access time due to better spacial locality, and improved cache-hit ratios. An optimal size space storage allocation technique optimizes the run time code, such that fewer instructions are required per each data access. A smaller local area, which is part of the activation record, is provided, such that there is a much greater level of nesting and better cache locality. Improved alignment base sorting is provided such that, based on alignment, the smallest stack frame possible is provided. Profile based optimization, which gathers information about the behavior of the program, is used to determine how best to order and layout storage during the next storage allocation pass, such that items that are accessed more often are allocated further up in the activation record. Temporal locality is used to determine what variables are going to be accessed in what order, where a graph that represents all of the variables is built up. The graph is weighted by the number of times each variable is accessed immediately before or after each other variable. Allocated variables are then laid out in such an order that variables that are accessed temporally close to each other are allocated on the same cache line. Thus, when a cache line hosting a variable is brought into the cache, the variables that are to be accessed next are also automatically brought into the cache because they have been allocated on the same cache line. Therefore, the need to retrieve additional cache lines is greatly reduced. This results in a reduced number of cache misses. Static duration storage is also used to relate to static defined data that is heap allocated.

26 Claims, 8 Drawing Sheets

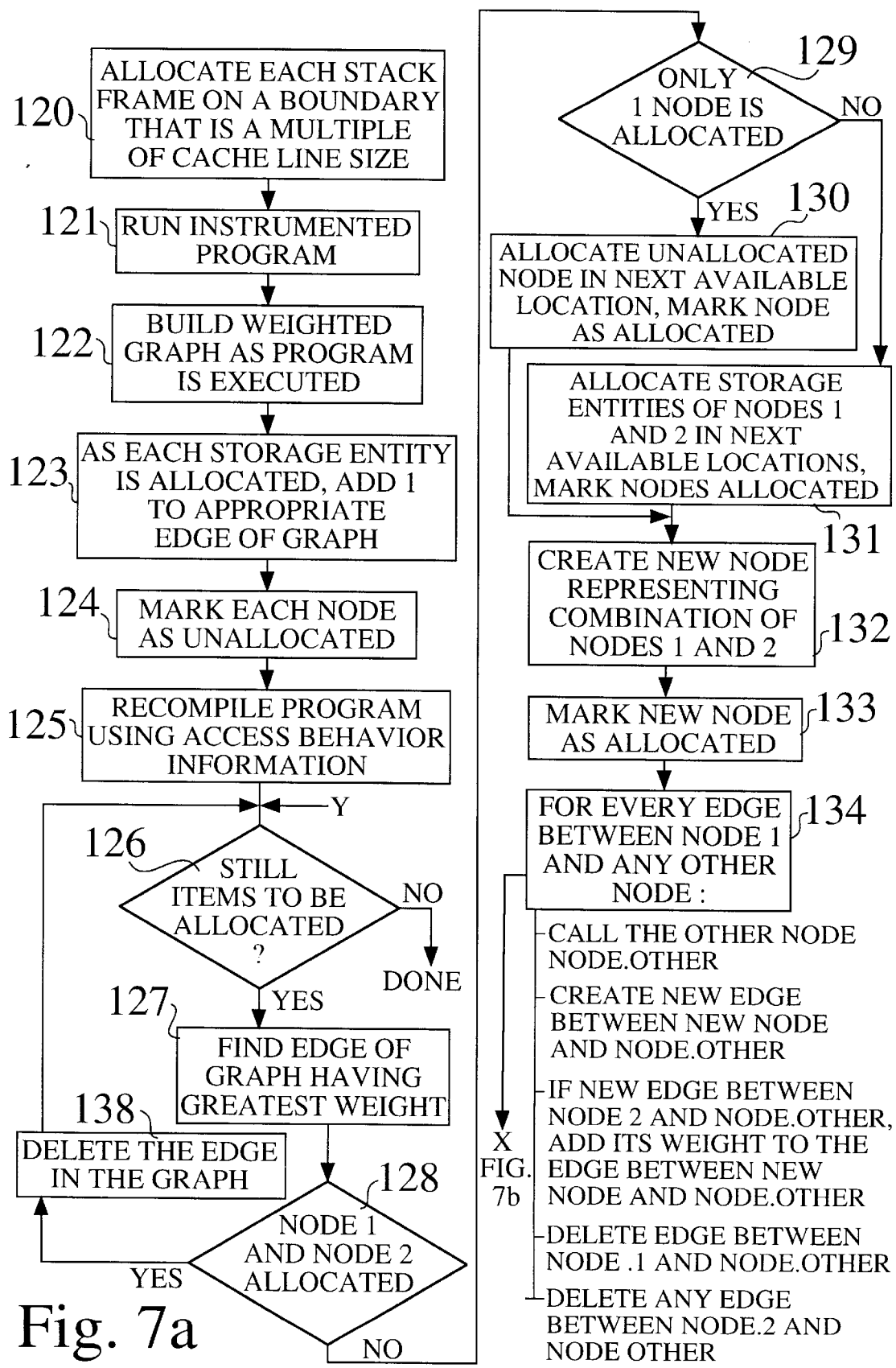

LANGUAGE INDEPENDENT OPTIMAL SIZE-BASED STORAGE ALLOCATION

BACKGROUND OF THE INVENTION

1. Technical Field

The invention relates to computers. More particularly, the invention relates to compiler technology that provides improved memory layout of automatic variables declared in a user program, commonly referred to as storage allocation.

2. Description of the Prior Art

Prior solutions to variable storage allocation by compilers allocated variables in memory in the order that they appear in a source program. This approach has the benefit of allowing for easily determined address ordering of variables. There are several patents that describe improvements to standard storage allocation techniques.

The following patents discuss storage allocation techniques that operate on dynamic information, i.e. during run-time:

S. Wei, *Self-Tuning Virtual Storage Management For Dedicated Real-Time Computer System*, U.S. Pat. No. 5,367,637 (Nov. 22, 1994) discloses a self-tuning method for the management of virtual storage in a dedicated real-time computer system that interposes a layer between the application and the real-time computer system to form a two-layer structure to meet an application's request for virtual storage, i.e. a buffer request. The method adds the slower allocation of the real-time system (layer two) to guarantee the creation of all other buffers during one real-time period. The self-tuning layer (layer one) is checked first to satisfy a buffer request, while the untuned second layer is entered to create a buffer when the first layer fails. Entrances to the second layer are used to monitoring mechanism from which a new pre-allocation definition, based on system usage history, is derived to tune the first layer at the next initialization time.

K. Karrick, *Dynamic Allocation In A Logic Analyzer*, U.S. Pat. No. 5,347,540 (Sep. 13, 1994) discloses a dynamic memory allocation scheme that conserves memory resources while providing interaction between concurrent synchronous and asynchronous acquisition of data for logic analysis.

W. Ashcraft, G. Woodside III, G. Currington. K. Robb, *Method of Virtual memory Storage Allocation With Dynamic Adjustment*, U.S. Pat. No. 5,247,60 (Sep. 21, 1993) discloses a method for dynamically managing the storage of information in a mass memory of a data processor, where the mass memory includes a plurality of volumes of write-once media such as optical discs. The volumes are grouped into volume sets which each contain at least one file set. The size of the file sets and volume sets is dynamically increased as needed during file storage.

The following patent discusses storage allocation techniques that operate in a garbage collection environment, i.e. a space optimization technique in which superfluous data are eliminated. Because such approaches are inherently dynamic, they do not address the static compilation of an application:

J. Gurd, K. Kawakami, *Storage Allocation and Garbage Collection Using Liberate Space Tokens*, U.S. Pat. No. 5,025,367 (Jun. 18, 1991) discloses a parallel storage allocation method in which each space in a memory section that is available for use is associated with a respective allocator. The method stores an identifier for the respective allocator. Data identifying allocators not in use are stored, and a list is maintained of allocators associated with spaces which are available for use. Each time a memory space is no longer in use a check is made to determine the allocator identifier of any already free space which can be combined with the memory space that is no longer in use. A liberate space token is generated that includes a first identifier that corresponds to an allocator which is not in use and a second identifier that correspond to any already free space to be combined.

The following patents discuss storage allocation techniques that operate on secondary storage:

H. Pennings, H. Wijgen, *Method of Changing Data on Disc*, U.S. Pat. No. 5,113,509 (May 12, 1992) discloses an input/output test and set operation for testing and changing data in an access status record on a direct access storage device in one atomic input/output operation.

R. Clifton, R. Phares, *Method and Apparatus for Assigning Data Sets to Virtual Volumes in a Mass Store*, U.S. Pat. No. 4,310,883 (Jan. 12, 1982) discloses a mass storage system having a multiplicity of storage volume containing addressable data in which the assignment of newly received data sets to the best storage volume is accomplished by determining the best match of the data set to the available volume.

See, also the following documents:

Research Disclosure No. RD 274,059 (Derwent WPI Acc. No. 87-077601/11), dated Feb. 10, 1987, "Dynamic Reorganization of Disc Storage Allocation Using Controller to Periodically Move Data Most Frequently Accessed to Portion of Disc With Shortest Access Time," discloses a device controller is programmed to periodically examine dynamic usage information to determine if a logical cylinder has become more active. If the cylinder become more active, then its informational contents are copied to a preferred area on a storage disk that is for high activity.

Oldehoeft, R. R., Allan, S. J., *Adaptive exact-fit storage management, Communications of the ACM*, vol. 21, no. 5 discusses storage allocation techniques that operate on dynamic information (during run-time).

Eisenbeis, C., *A Strategy For Array Management in Local Memory, Inst. Nat. Recherche Inf. Autom.*, LeChesnay, France discusses a management strategy scheme which assists in determining when to load and unload portions of arrays and matrices into local memory and how to manage processor coherence.

See, also Aho, Sethi, Ullman, *Compilers, Principles, Techniques, and Tools*, Addison-Wesley Publishing Company (1985); and M. E. Wolf, *Improving Locality and Parallelism in Nested Loops*, Technical Report: CSL-TR-92-538, CSL, Dept. of EE and CS, Stanford University.

It would be desirable to achieve improved performance without compromising program correctness. It would especially helpful if a technique were available that operated on static information (during compile-time), and that provided a solution that addressed entire automatic variables independently of the programs source language.

SUMMARY OF THE INVENTION

The invention provides improved compiler performance of run time code generated by a compiler, without compromising program correctness, by altering the commonly expected ordering that has been used in the past. The invention is a method and apparatus that provides a more efficient memory image which results in the following advantages:

Smaller stack frames (activation records).

Less required heap space (static data memory storage).

Improved variable access time due to better spacial locality.

Improved cache-hit ratios.

One aspect of the invention provides optimal size space storage allocation. That is, the invention optimizes the run time code such that fewer instructions are required per each data access.

The invention also makes possible a smaller local area, which is part of the activation record. Whenever a procedure or a function call is made, it is necessary to add another activation record onto the system stack. A larger local area provides fewer routines that can be called recursively at run time. If the local area is small, there is a much greater level of nesting, e.g. a million routines can be called on top of each other. If the activation record is very large, the number of routines that can be called is reduced drastically.

In addition, better cache locality is possible with a smaller activation record. Thus, when one item of memory is pulled into the cache, there is a better chance of also getting other items soon after that that are to be used and that have temporal locality. Thus, a smaller activation record requires fewer cache lines to represent the activation record.

The invention also provides improved alignment base sorting such that, based on alignment, the smallest stack frame possible is provided.

Another aspect of the invention provides profile based optimization, which gathers information about the behavior of the program that is used to determine how best to order and layout storage during the next storage allocation pass. Thus, items that are accessed more often are allocated further up in the activation record. Because an activation record may require two or more RISC instructions to access a certain item as the record grows in size, it is more likely that only one instruction is required in the RISC processor if items that are accessed most frequently are placed close to the base of the activation record.

A further aspect of the invention is temporal locality where, based on an instrumented run, it is possible to determine what variables are going to be accessed in what order. The invention builds up a graph that represents all of the variables. The graph is weighted by the number of times each variable is accessed immediately before or after each other variable. Allocated variables are then laid out in such an order that variables that are accessed temporally close to each other are allocated on the same cache line. Thus, when a cache line hosting a variable is brought into the cache, the variables that are to be accessed next are also automatically brought into the cache because they have been allocated on the same cache line. Therefore, the need to retrieve additional cache lines is greatly reduced.

An additional aspect of the invention provides static duration storage which relates to static defined data which is heap allocated.

DETAILED DESCRIPTION OF THE INVENTION

Figure 1:
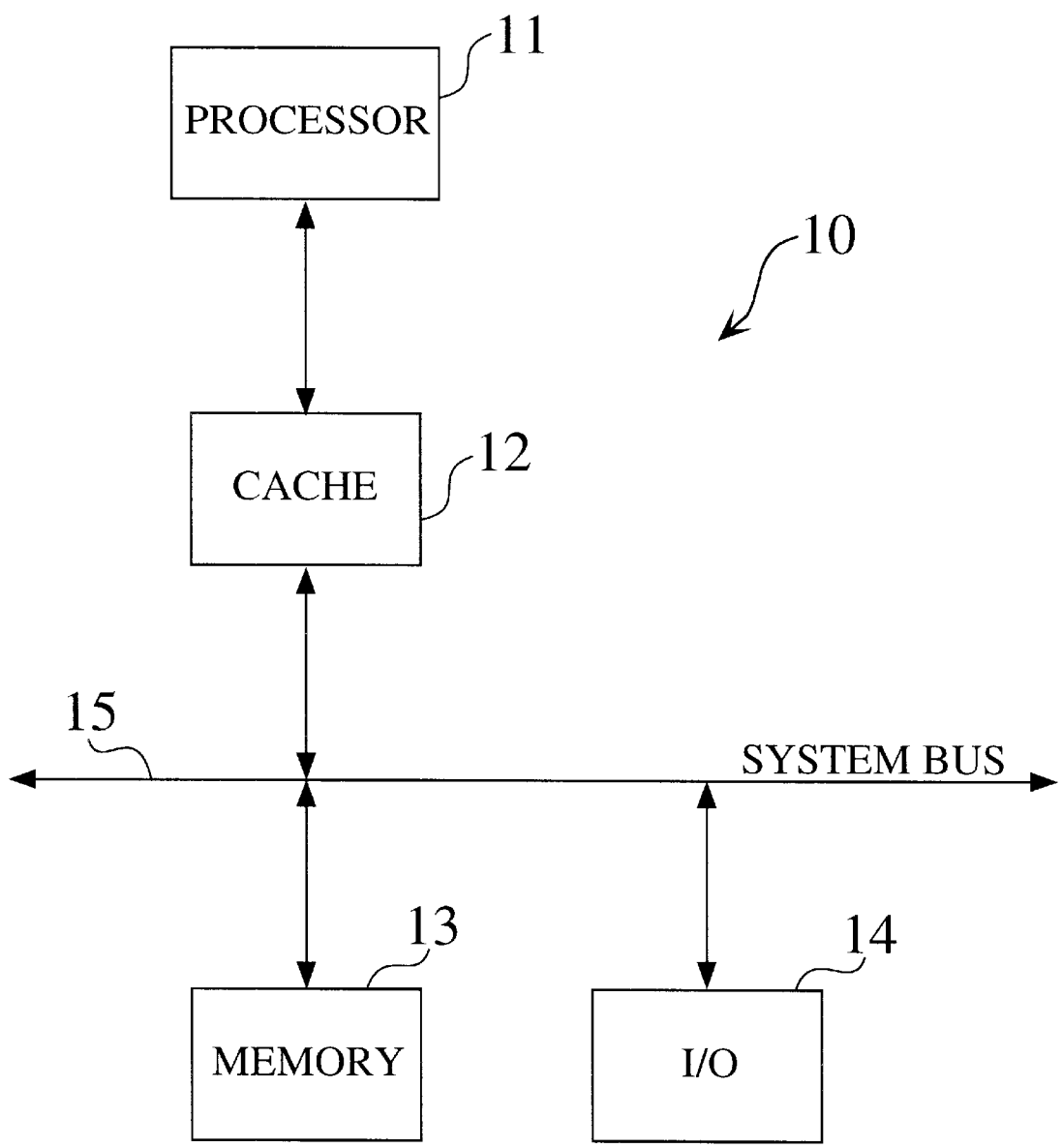
FIG. 1 provides a block schematic diagram of a uniprocessor computer architecture including a processor cache.

FIG. 1 is a block schematic diagram of a uniprocessor computer architecture 10 including a processor cache. In the figure, a processor 11 includes a cache 12 which is in communication with a system bus 15. A system memory 13 and one or more I/O devices 14 are also in communication with the system bus.

Figure 2:
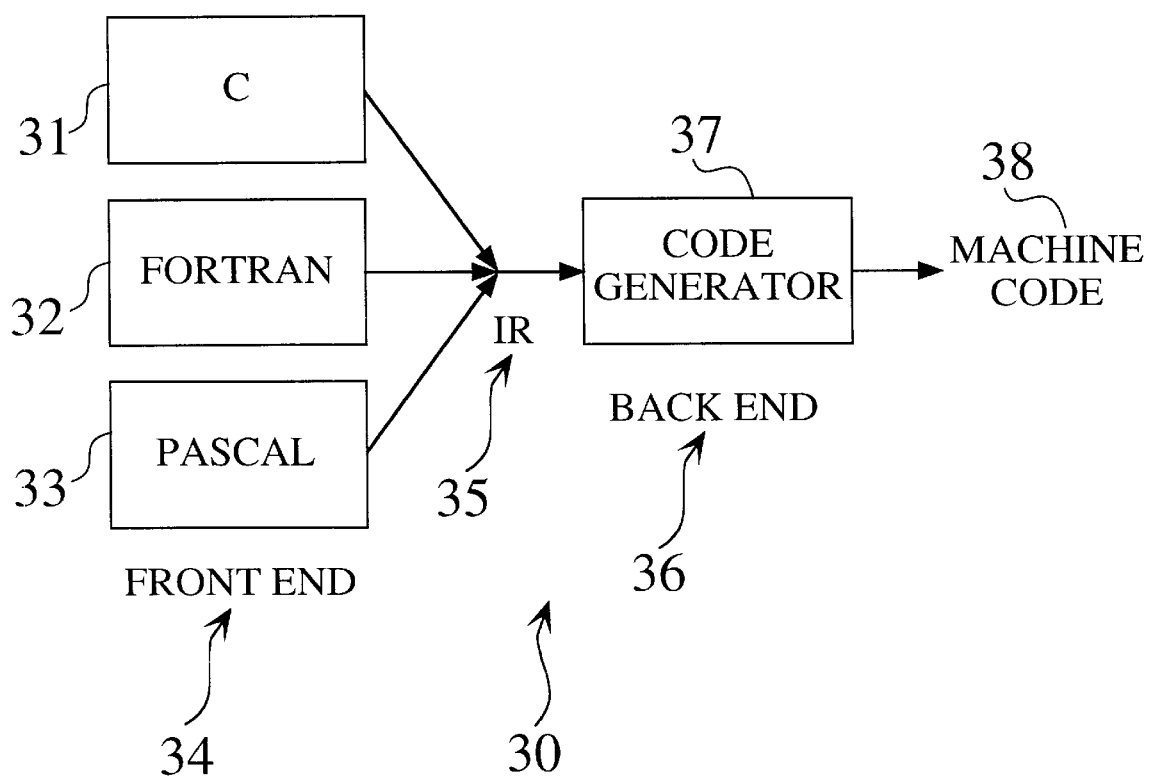
FIG. 2 is a block schematic diagram of a software compiler, for example as may be used in connection with the computer architecture shown in FIG. 1.

FIG. 2 provides a high level functional overview of compiler 30 construction. Various front ends in such languages as C 31, Fortran 32, and Pascal 33 interface with the same backend 36. The frontends (collectively identified by the numeric designator 34) generate a machine independent intermediate representation (IR) 35 which is consumed by the backend. The backend 36 uses a code generator 37 to translate the IR 35 into machine code 38 which, after linking and loading, can be run directly on a computer 10. In this common model, the IR allows an automatic variable, also known as a local variable, to be read from or written to by accessing its offset from a pre-defined location in the current activation record. These are often referred to as SP-relative (stack pointer relative) accesses.

FIG. 2 illustrates that, in the code generator, a low level RISC code is generated, i.e. code that could be executed by a RISC-based processor. The code generator takes the code, generates ancillary data structures that help the code generator understand the code, and then starts to transform the code or modify the code so that when the code comes out, the final optimized instruction stream runs faster on the target processor architecture.

The code generator discussed herein is implemented with a machine-specific optimizer that understands the nuances of a particular RISC architecture (in the preferred embodiment of the invention, the PA-RISC architecture, which is owned by Hewlett-Packard Company of Palo Alto, Calif.).

While the invention is described in connection with a specific code generator, it should be appreciated that the invention is also readily applicable as a preprocessor, which looks at source code at the source code level, i.e. a high level optimizer. However, it is generally preferred to implement the invention in a back end code generator because such application is limited to a particular code sequence for a machine-specific code generator. Thus, the code generator is more likely to know when it is beneficial to apply the various enhancements taught herein and when it is not beneficial to do so.

Figure 3:
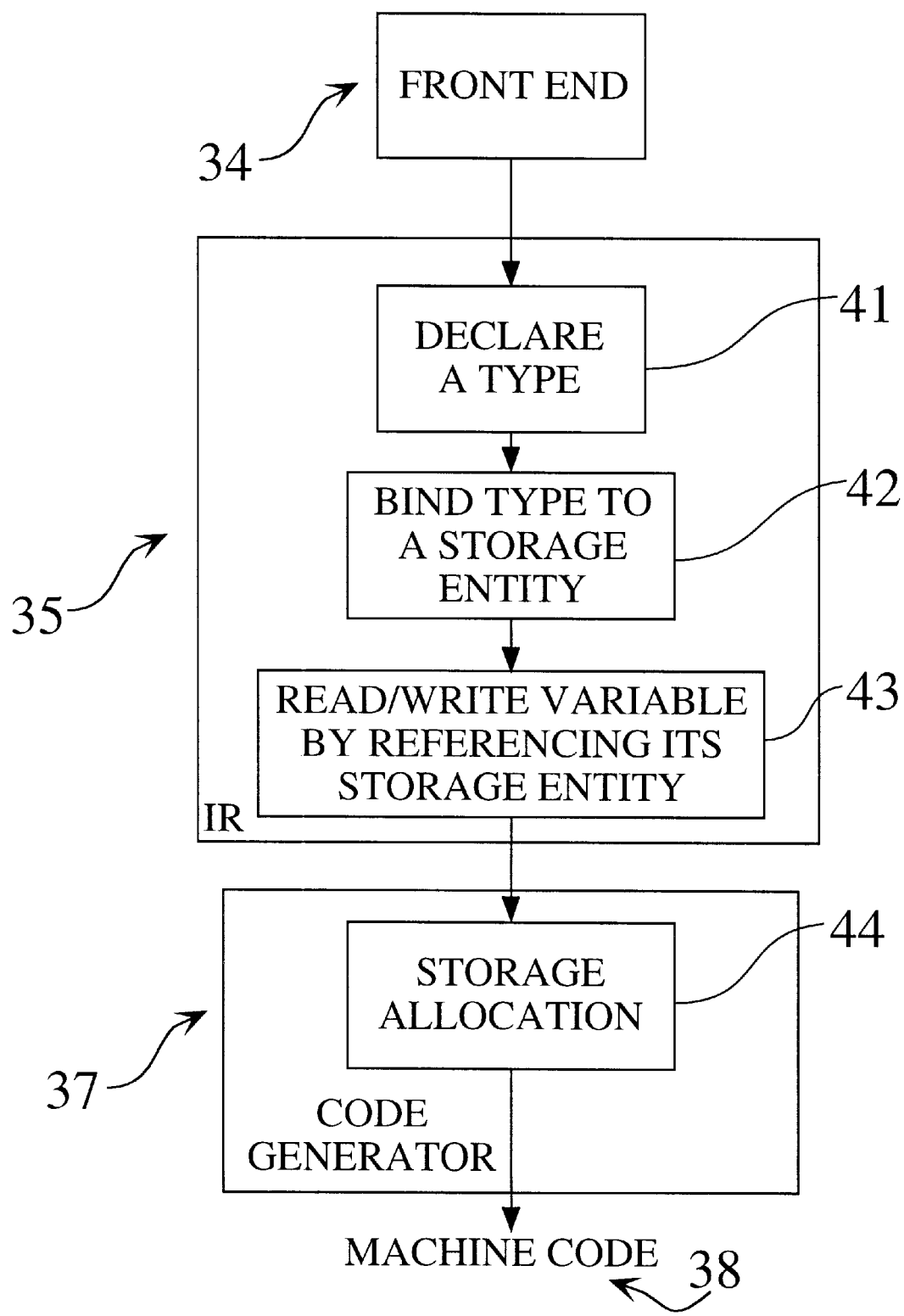
FIG. 3 is a block diagram showing augmentation of an intermediate representation in accordance with the invention.

To allow the invention to provide a technique that is language independent, it is first necessary to change the standardly accepted location where storage allocation of automatic variables is performed. This task is typically performed by the front end. The invention provides a means to postpone this operation until the code generator stage. FIG. 3 is a block diagram showing augmentation of an intermediate representation in accordance with the invention. The IR 35 must have the following augmentations:

1. Augmenting the IR to allow the description of a variable's type. The type information includes the size and other characteristics of the variable. This is referred to as declaring a type in the IR 41.

2. Augmenting the IR to provide a means to indicate a storage entity has a certain previously declared type. This is referred to as binding a type to a storage entity 42. The resulting variable is now a type bound storage entity.

3. Augmenting the IR to allow a variable to be read from or written to by referencing its storage entity 43 rather than a SP-relative location.

Once the augmentations are in place, the storage allocation 44 may be performed by the code generator 37 rather than the front-end 34. This allows every front-end that generates the IR 35 to receive the same benefits. The IR then becomes language independent (where each front-end translates a different source language code into the same IR).

Figure 4:
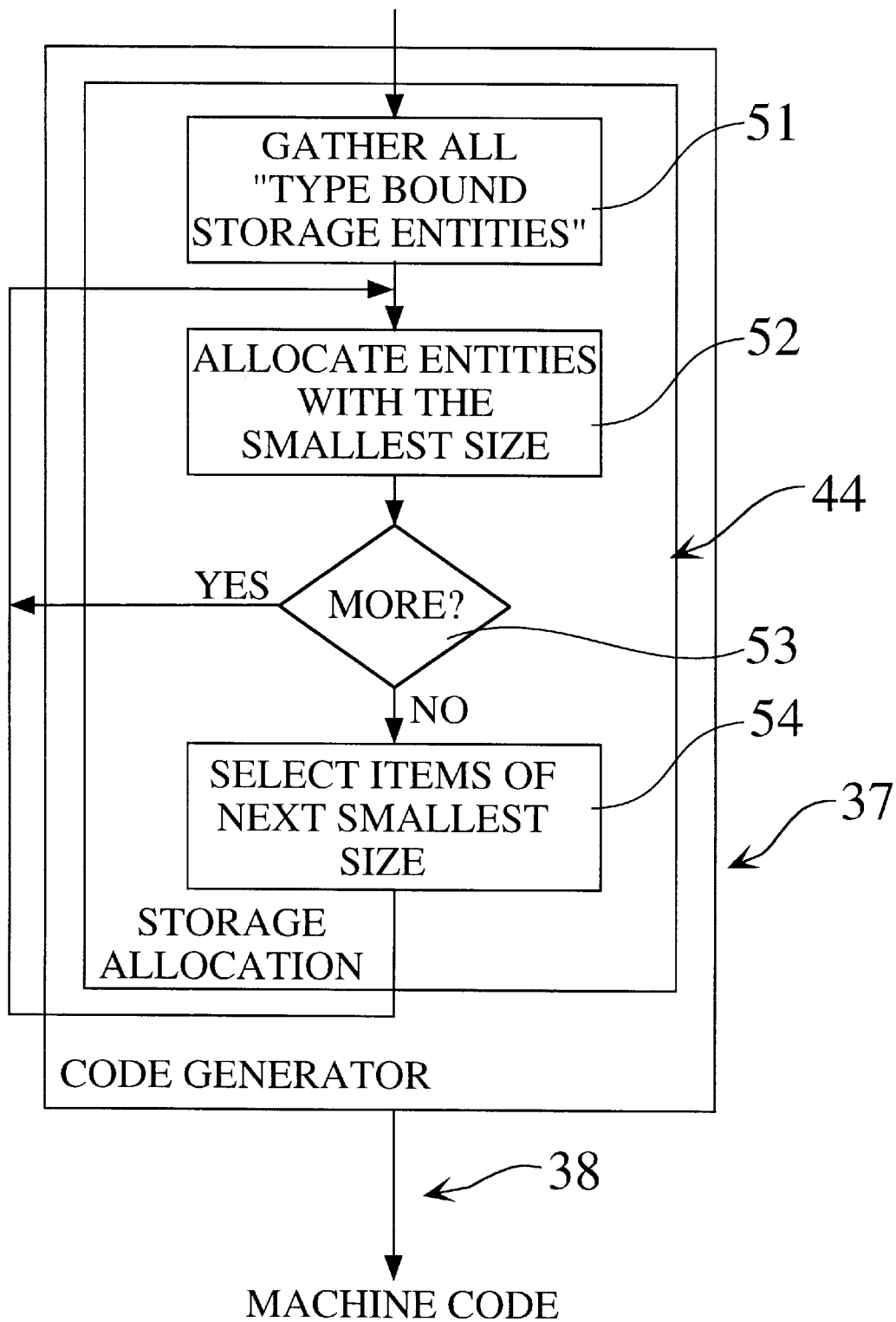
FIG. 4 is a block diagram showing optimal size-based storage allocation in accordance with the invention.

FIG. 4 is a block diagram showing optimal size-based storage allocation in accordance with the invention. The responsibility of storage allocation now rests in the code generator 37. The code generator gathers all type bound storage entities 51 and sorts them based on size 52. The entities that have the smallest size, as determined by their type, are sorted at the beginning and the entities that have the largest size are sorted at the end.

Size-based allocation algorithm.

BEGIN: while there are still items to be allocated, do the following:
  a. Allocate entities with the smallest size 52 until there are no more items of this size 53.
  b. Select items of the next smallest size 54.
  c. Goto BEGIN.

When storage allocation takes place in the code generator, the smallest entities are allocated closer to the base address in the activation record and the largest are allocated farthest from the base address in the activation record. The result is that the summation of all offsets of all storage entities from the base address in the activation record is kept to a minimum. This results in a number of benefits:

1. Fewer instructions per access:

In RISC architectures, an instruction that encodes a BASE_REGISTER+OFFSET access has a limited reach (the allowable size of the offset that can be encoded in the instruction). For example, in PA-RISC, this offset is limited to 14 bits ($2^{14}=16384$). Therefore, any variable that is more than 16384 storage units (bytes) away from value in the base register cannot be accessed in a single instruction.

By increasing the number of storage entities that are within this size limitation, a larger number of storage entities can be accessed with a single RISC instruction. This reduces the sum of all instructions required to access all storage entities, which improves performance and reduces the size of the executable image.

2. Smaller Local Area (and therefore smaller activation record):

In general, storage entities of a given type have alignment restrictions. For example, an entity of a type that is 32-bits in size is required to be allocated to a memory location that falls on a 32-bit boundary (also referred to as 4-byte aligned), a 16-bit entity must be allocated on a 16-bit boundary (2-byte aligned), and an 8-byte entity must be byte aligned. During storage allocation, if the next available byte location is not aligned to the needs of the type of the storage entity, padding is inserted. This padding is wasted, unused space.

By sorting the storage entities based on size, it has been found that entities having the same alignment requirements are next to each other, and the need for padding is greatly reduced. This reduces the amount of storage space wasted by padding and therefore reduces the overall stack frame size.

A smaller stack frame size reduces the sum of all instructions required to access all storage entities by allowing more storage entities to fall within the reach described above (i.e. in connection with fewer instructions per access) and also increases the number of stack frames that can be dynamically allocated, increasing the maximum amount of dynamic run-time nesting, by decreasing the size of each stack frame.

Example

In this example, type sizes and alignment constraints are as follows:

| Type | size | alignment constraints |
|------|------|----------------------|
| char | 1 byte | must be at least 1 byte aligned |
| short | 2 bytes | must be at least 2 byte aligned |
| int | 4 bytes | must be at least 4 byte aligned |

```
procedure()
{
char c1;
int i1;
char c2
short s1;
}
```

Standard storage allocation techniques allocate this in the order of declaration, which results in unnecessary padding due to the alignment constraints of the types being allocated:

```
offset 0:c1
offset 1:<padding>
offset 2:<padding>
offset 3:<padding>
offset 4:i1
offset 5:i1
offset 6:i1
offset 7:i1
offset 8:c2
offset 9:<padding>
offset 10:s1
offset 11:s1
```

Of the 12 bytes required to represent this local area, four bytes are wasted padding. The average offset from the base local area pointer for each storage entity is $(0+4+8+10)/4=5.5$ bytes.

The following allocation is provided using the size-based allocation algorithm described herein:

```
offset 0:c1
offset 1:c2
offset 2:s1
offset 3:s1
offset 4:i1
offset 5:i1
offset 6:i1
offset 7:i1
```

This example requires only eight bytes, i.e. no bytes are wasted with padding. The average offset of each storage entity is $(0+1+2+4)/4=1.75$ bytes, a substantial improvement over the offset of 5.5 byte required by prior art approaches.

End of Example

Because the prior art practice of storage allocation based on order of user declaration is no longer necessary in view of improvements offered by the invention herein described, there are a number of other optimized criteria that can be used. Each of these has a different benefit and can all be provided to the user by use of a compile-time option.

1. Minimal Local Area (alignment based sorting).

Figure 5:
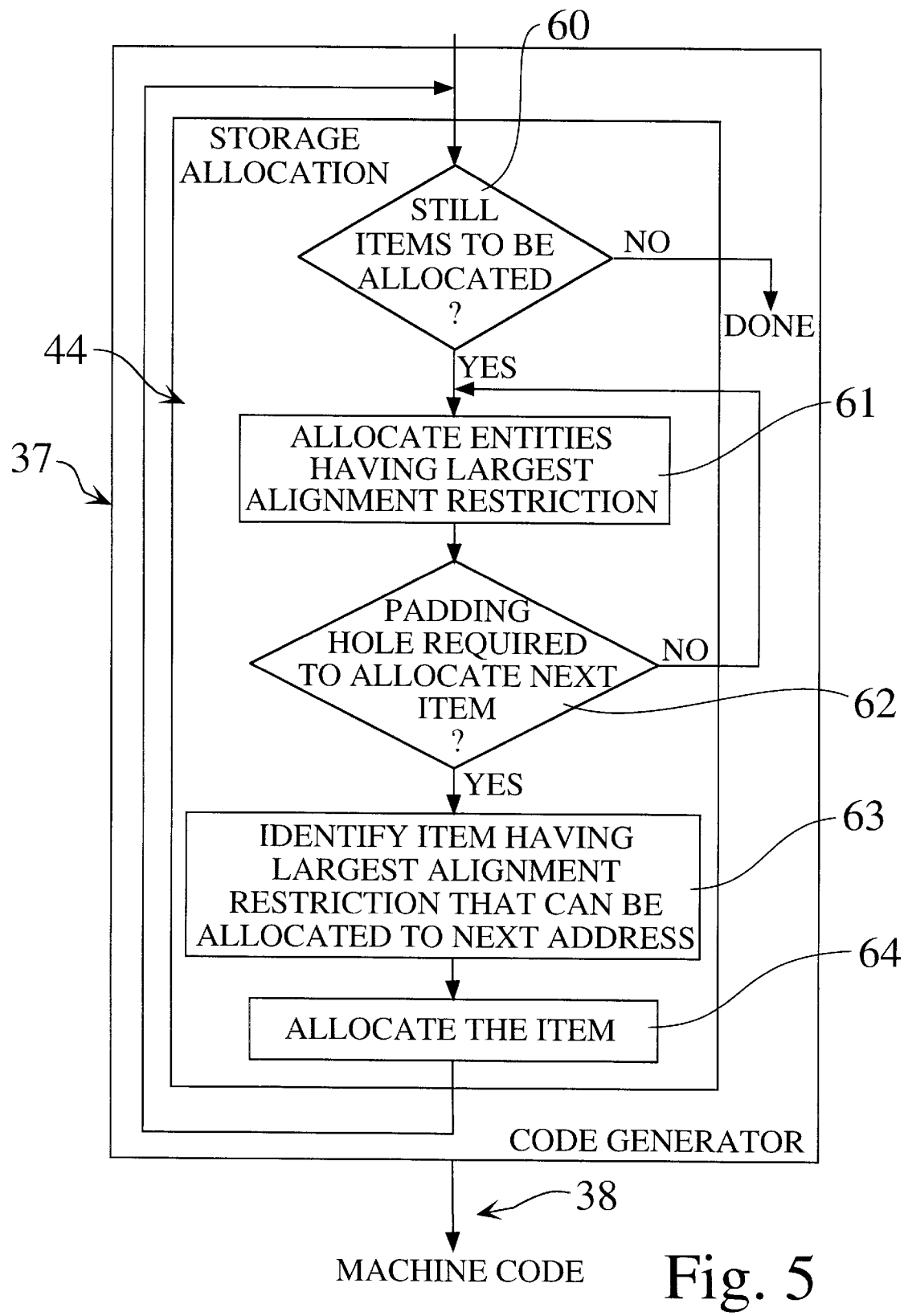
FIG. 5 is a block diagram showing alignment based allocation in accordance with the invention.

FIG. 5 is a block diagram showing alignment based allocation in accordance with the invention. Alignment is a consideration when performing storage allocation. The total stack frame size can be also be reduced by eliminating additional padding required due to alignment restrictions. The portion of a stack frame that is used for automatic variables is referred to as the local area. The size of the local area can be kept to a minimum by allocating entities that have a larger alignment restriction first and filling any padding holes with items that have a smaller alignment restriction. This is opposed to performing allocation solely based on size. Thus, the sorting algorithm described is modified to the following:

Alignment based allocation algorithm:
BEGIN: while there are still items to be allocated 60, do the following:
  a. Allocate entities with the largest alignment restriction 61 until it is found that a padding hole is required to allocate the next entity 62.
  b. When it is found that a hole is required, identify the item with the largest alignment restriction that can be allocated to the next available address 63.
  c. Allocate that item 64.
  d. Goto BEGIN.

2. Number of access considerations.

Figure 6:
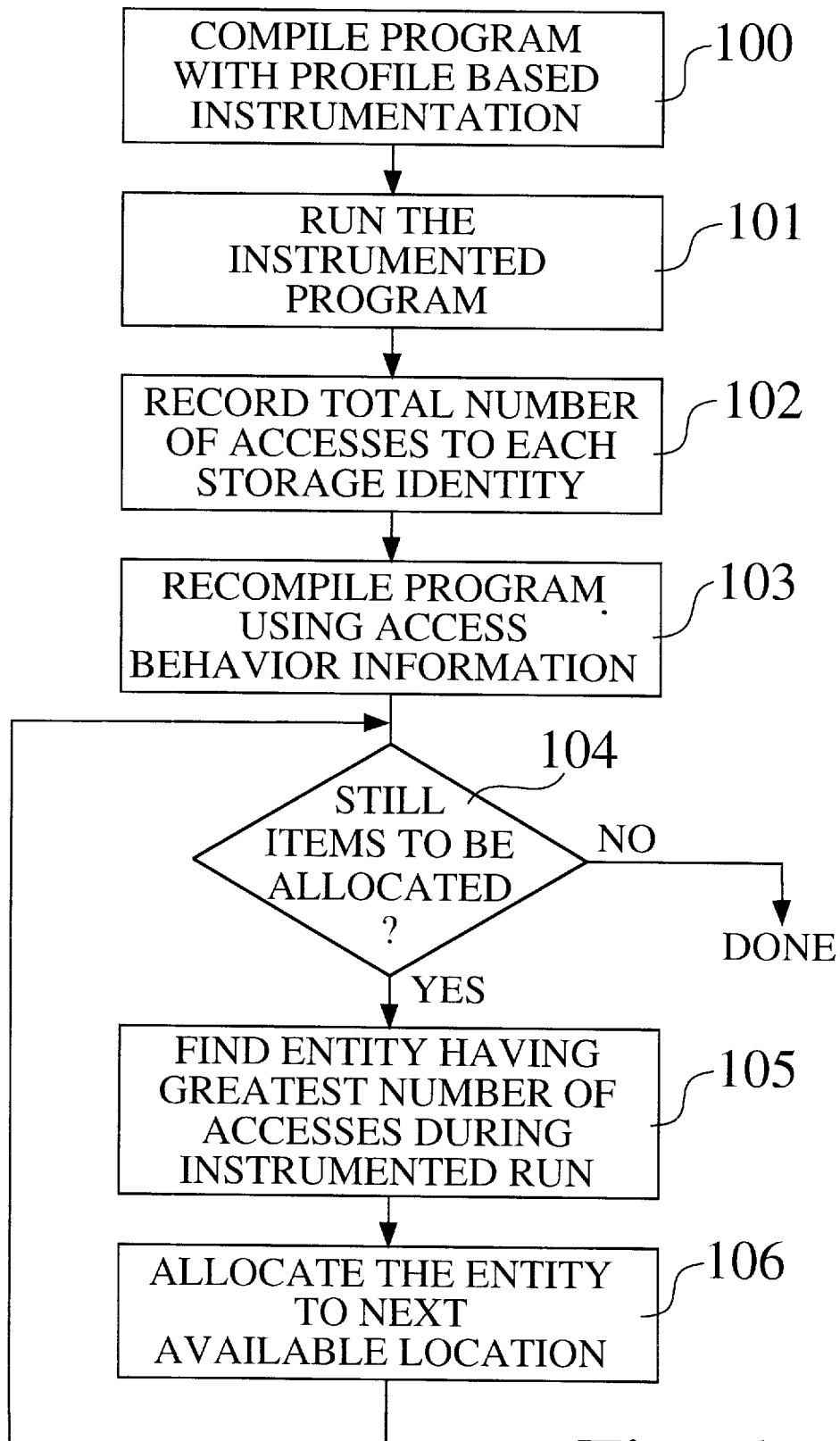
FIG. 6 is a block diagram showing profile based optimization in accordance with the invention.

FIG. 6 is a block diagram showing profile based optimization in accordance with the invention. This method leverages off of a profile based system that allows a program to be instrumented and run while gathering dynamic information about a program's behavior. The program is then recompiled with this new information. This approach is referred to as profile based optimization, where storage allocation is performed by allocating the most frequently accessed storage entities closest the base address of the local area. The goal is to ensure the greatest number of accesses to storage entities can be performed with the fewest instructions. Storage entities that are seldom or never accessed during the profiling runs are allocated farthest from the base address and may therefore require additional instructions due to the reach limitations discussed above.

Number of accesses algorithm:
PRELIMINARY
  a. Compile the program with profile based instrumentation (100).
  b. Run the instrumented program with an input stream representative of common use (101). Record the total number of accesses to each storage entity (102).
  c. Recompile the program (103) using the access behavior gathered in step b.
BEGIN
While there are still items to be allocated (104) do the following:
  d. Find the entity with the greatest number of accesses during the instrumented run (105).
  e. Allocate this entity to the next available location (106) (closest to the base local area address).
  f. goto BEGIN.

3. Temporal locality considerations (cache line considerations).

Figures 7A, 7B:
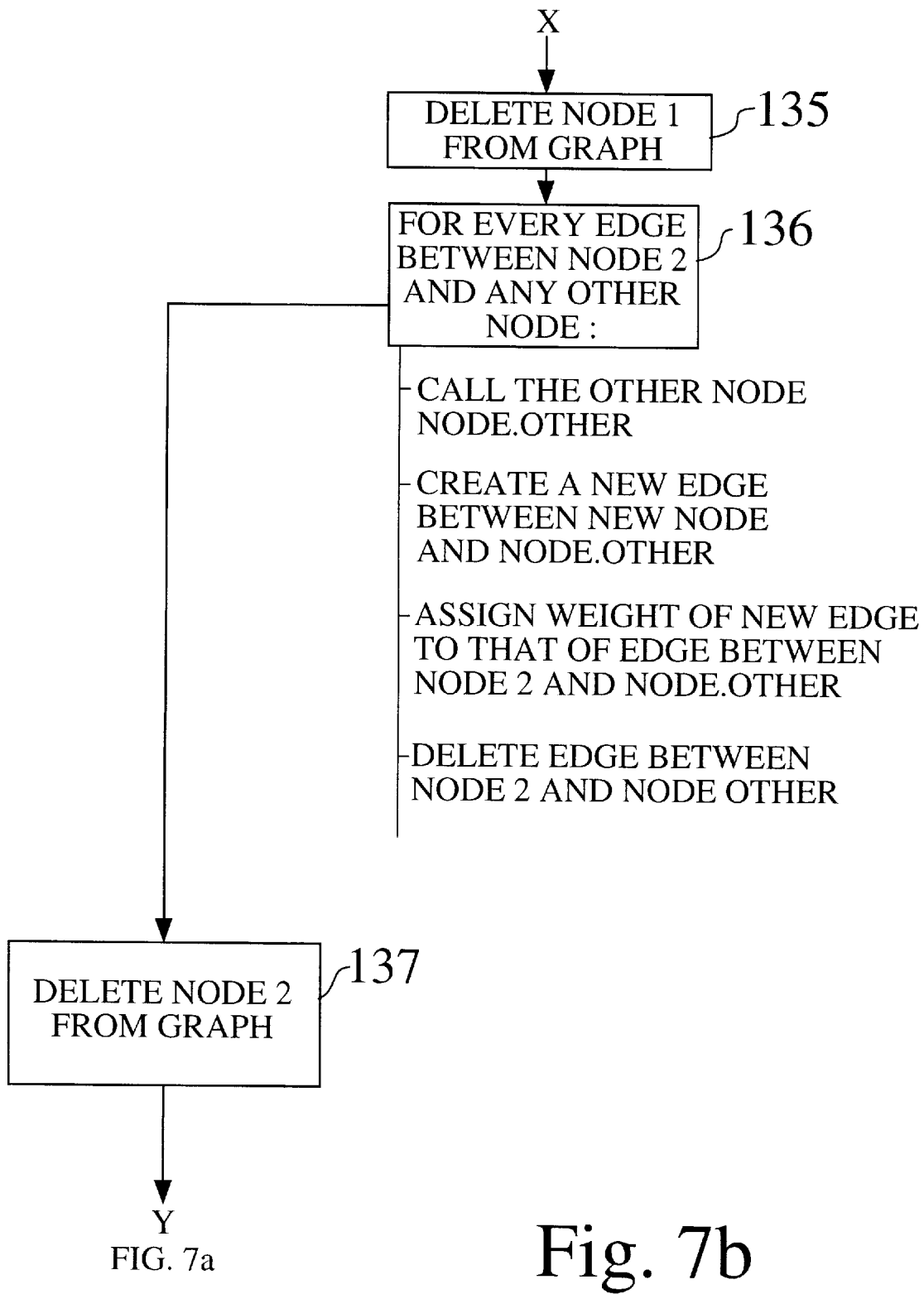
FIGS. 7a and 7b is a block diagram showing a temporal locality algorithm in accordance with the invention.

The invention also provides a technique that leverages off of the profiling technology described above. FIGS. 7a and 7b is a block diagram showing a temporal locality algorithm in accordance with the invention. The goal of this technique is to improve cache-hit ratios by allocating storage entities that are accessed temporally close, i.e. close to one another based on time, on the same cache line. This improves cache-hits since storage entities that are accessed one after the other are on the same cache line.

In overview, this approach creates a graph with each storage entity as a node where the edges between each node have a value that represents the number of times a storage entity was accessed immediately before or after another storage entity. The graph represents temporal locality magnitude.

The storage allocator then allocates storage entities on the same cache line that have the greatest temporal locality magnitudes. The benefit of this algorithm is increased when a spatial cache prefetch is built into the compiler. Spatial cache prefetch is a technology that fetches one or more cache lines from memory that immediately follow the current cache line being fetched.

The following describes a technique for improving application performance using temporal locality information between variables (storage entities), rather than array or matrix access locality. The following is provided as an example of an algorithm that can take temporal locality into account when performing storage allocation. It is a low complexity overhead algorithm (N logN) that can be efficiently implemented in commercial compilers. The algorithm is not intended to provide optimal temporal locality, only optimized temporal locality.

Temporal Locality Algorithm
PRELIMINARY
  a. Ensure each stack frame is allocated on a boundary that is a multiple of the architecture's cache line size (120). This is necessary to allow the storage allocator to allocate automatic variables that fall into determinable cache line patterns statically.
  b. Run the instrumented program (121) with an input stream representative of common use. Build the above described weighted graph as the program is executed (122). As each storage entity is accessed, add one to the appropriate edge of the graph (123). The edge is determined to be the edge which has nodes on each end representing the current storage entity and the entity last accessed. Mark each node as unallocated (124).
  c. Recompile the program using the access behavior gathered in step b (125).
BEGIN
While there are still items to be allocated (126) do the following:
  d. Find the edge with the greatest weight (127). Consider the two nodes bounding the edge Node1 and Node2.
  e. If both Node1 and Node2 are marked as allocated (128), delete the edge in the graph (138) and goto BEGIN. Else goto f.
  f. If one of the nodes is marked as allocated and the other is not (129), allocate the node marked as unallocated in the next available location, mark the node as allocated (130) and Goto MERGE. Else goto g.
  g. NOTE: At this point we have identified two storage entities that have not been merged or allocated. Allocate the two storage entities that are represented by Node1 and Node2 in the next available locations. Mark both nodes as allocated (131). Goto MERGE.
MERGE
At this point, one or two storage entities are allocated, now merge the two nodes into one.
  h. Create a new node (132) which represents the combination of Node1 and Node2. Call this new node Node.New. Mark Node.New as being allocated (133).

i. For every edge E between Node1 and any other node in the graph do the following (134):
   i.1 Call the other node on this edge Node.Other
   i.2 Create a new edge between Node.New and Node.Other. Its initial weight is assigned the weight of the edge between Node1 and Node.other.
   i.3 If there is an edge between Node2 and Node.other, add its weight to the edge between Node.New and Node.Other.
   i.4 Delete the edge between Node1 and Node.Other.
   i.5 If it exists, delete the edge between Node2 and Node.other.
j. Delete Node1 from the graph (135).
k. For every edge E between Node2 and any other node in the graph do the following (136):
   i.1 Call the other node on this edge Node.Other
   i.2 Create a new edge between Node.New and Node.Other. Its weight is assigned the weight of the edge between Node2 and Node.other.
   i.4 Delete the edge between Node2 and Node.Other.
l. Delete Node2 from the graph (137).
m. Goto BEGIN.

The invention is also applicable to static defined data (heap allocated). The backend lays out the static data based on an offset from a data pointer. This allocation is performed with the same methods described for automatic variables. This results in less required heap space and can also realize the same cache hit ratio improvement with reference access counts provided by a profiling feedback technology.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A method for storage allocation of automatic variables in code generated by a code generator, comprising the steps of:
   declaring a variable type where type information associated therewith includes size and other characteristics of a variable;
   binding a type to a storage entity to create a type bound storage entity which indicates that said type bound storage entity has a certain previously declared type; and
   referencing said storage entity for said variable to allow said variable to be read from or written to;
   wherein storage allocation is performed by said code generator, such that an intermediate representation of the generated code is language independent.

2. The method of claim 1, further comprising the steps of:
   gathering said type bound storage entities; and
   sorting said type bound storage entities based on entity size, where entities that have a smallest size, as determined by their type, are sorted first and entities that have a largest size are sorted last.

3. The method of claim 1, further comprising the steps of:
   allocating entities having a smallest size until there are no more items of this size; and
   selecting items of a next smallest size;
   wherein smallest entities are allocated closer to a base address in an activation record and largest entities are allocated farthest from said base address in said activation record, such that summation of all offsets of all storage entities from said base address in said activation record is kept to a minimum.

4. The method of claim 1, further comprising the steps of:
   allocating entities with a largest alignment restriction until it is found that a padding hole is required to allocate a next entity;
   identifying an item with a largest alignment restriction that can be allocated to a next available address when it is found that a hole is required; and
   allocating said item with a largest alignment restriction.

5. The method of claim 1, further comprising the steps of:
   laying out static data based on an offset from a data pointer.

6. A method for allocating most frequently accessed storage entities closest to a base address of a local area to ensure that a largest number of accesses to storage entities can be performed with a smallest number of instructions, comprising the steps of:
   compiling a program with a profile based instrumentation;
   running said instrumented program with an input stream representative of common use;
   finding an entity having a greatest number of accesses during said instrumented run; and
   allocating said entity to a next available location closest to a base local area address;
   recording a total number of accesses to each storage entity; and
   recompiling said program using access behavior gathered during said instrumented run.

7. The method of claim 6, further comprising the steps of:
   laying out static data based on an offset from a data pointer.

8. A method for improving cache-hit ratios by allocating storage entities that are accessed close to one another based on time on a same cache line, comprising the steps of:
   creating a graph with each storage entity as a node where edges between each node have a value that represents a number of times a storage entity was accessed immediately before or after another storage entity, wherein said graph represents temporal locality magnitude;
   allocating storage entities on a same cache line that have the greatest temporal locality magnitudes; and
   ensuring each stack frame is allocated on a boundary that is a multiple of a target architecture cache line size, wherein automatic variables that fall into determinable cache line patterns are statically allocated.

9. The method of claim 8, further comprising the step of:
   fetching one or more cache lines from memory that immediately follow a current cache line being fetched.

10. The method of claim 8, further comprising the steps of:
    running an instrumented program with an input stream representative of common use;
    building said graph as said program is run;
    adding one to an appropriate edge of said graph as each storage entity is accessed, where said edge is determined to be an edge that has nodes on each end representing a current storage entity and an entity last accessed;
    marking each node as unallocated; and
    recompiling said program using access behavior gathered during said instrumented run.

11. The method of claim 10, further comprising the steps of:

finding an edge having a greatest weight;

identifying two nodes bounding said edge as Node1 and Node2;

deleting said edge in said graph if both Node1 and Node2 are marked as allocated;

allocating a node marked as unallocated in a next available location if one of said nodes is marked as allocated and another node is not; and marking said node as allocated.

12. The method of claim 11, further comprising the steps of:

allocating said two storage entities that are represented by Node1 and Node2 in any next available locations if matter is marked allocator; and marking both nodes as allocated.

13. The method of claim 12, further comprising the steps of:

creating a new node Node.New that represents a combination of Node1 and Node2;

marking Node.New as being allocated;

for every edge E between Node1 and any other node in said graph performing the steps of:
calling said other node on said edge Node.Other;
creating a new edge between Node.New and Node.Other
assigning said new edge an initial weight that is a weight of an edge between Node1 and Node.other;
adding said weight to an edge between Node.New and Node.Other if there is an edge between Node2 and Node.other;
deleting said edge between Node1 and Node.Other;
deleting any edge between Node2 and Node.other;
deleting Node1 from said graph;

for every edge E between Node2 and any other node in said graph performing the steps of:
calling said other node on said edge Node.Other;
creating a new edge between Node.New and Node.Other;
assigning said edge weight a weight of said edge between Node2 and Node.other;
deleting said edge between Node2 and Node.Other;
deleting Node2 from said graph.

14. An apparatus for storage allocation of automatic variables in a code generated by code generator, comprising:

means for declaring a variable type where type information associated therewith includes size and other characteristics of a variable;

means for binding a type to a storage entity to create a type bound storage entity which indicates that said type bound storage entity has a certain previously declared type; and mean for referencing said storage entity for said variable to allow said variable to be read from or written to;

wherein storage allocation is performed by said code generator, such that an intermediate representation of the generated code is language independent.

15. The apparatus of claim 14, further comprising:

means for gathering said type bound storage entities; and means for sorting said type bound storage entities based on entity size, where entities that have a smallest size, as determined by their type, are sorted first and entities that have a largest size are sorted last.

16. The apparatus of claim 14, further comprising:

means for allocating entities having a smallest size until there are no more items of this size; and means for selecting items of a next smallest size;

wherein smallest entities are allocated closer to a base address in an activation record and largest entities are allocated farthest from said base address in said activation record, such that summation of all offsets of all storage entities from said base address in said activation record is kept to a minimum.

17. The apparatus of claim 14, further comprising:

means for allocating entities with a largest alignment restriction until it is found that a padding hole is required to allocate a next entity;

means for identifying an item with a largest alignment restriction that can be allocated to a next available address when it is found that a hole is required; and means for allocating said item with a largest alignment restriction.

18. The apparatus of claim 14, further comprising:

means for laying out static data based on an offset from a data pointer.

19. An apparatus for allocating most frequently accessed storage entities closest to a base address of a local area to ensure that a largest number of accesses to storage entities can be performed with a smallest number of instructions, comprising:

a compiler for compiling a program with a profile based instrumentation;

a processor for running said instrumented program with an input stream representative of common use;

means for finding an entity having a greatest number of accesses during said instrumented run; and means for allocating said entity to a next available location closest to a base local area address;

a memory for recording a total number of accesses to each storage entity;

wherein said compiler recompiles said program using access behavior gathered during said instrumented run.

20. The apparatus of claim 19, further comprising:

means for laying out static data based on an offset from a data pointer.

21. An apparatus for improving cache-hit ratios by allocating storage entities that are accessed close to one another based on time on a same cache line, comprising:

means for creating a graph with each storage entity as a node where edges between each node have a value that represents a number of times a storage entity was accessed immediately before or after another storage entity, wherein said graph represents temporal locality magnitude;

means for allocating storage entities on a same cache line that have the greatest temporal locality magnitudes; and means for ensuring each stack frame is allocated on a boundary that is a multiple of a target architecture cache line size, wherein automatic variables that fall into determinable cache line patterns are statically allocated.

22. The apparatus of claim 21, further comprising:

means for fetching one or more cache lines from memory that immediately follow a current cache line being fetched.

23. The apparatus of claim 21, further comprising:

a processor for running an instrumented program with an input stream representative of common use;

means for building said graph as said program is run;

means for adding one to an appropriate edge of said graph as each storage entity is accessed, where said edge is determined to be an edge that has nodes on each end representing a current storage entity and an entity last accessed;

means for marking each node as unallocated; and a compiler for recompiling said program using access behavior gathered during said instrumented run.

24. The apparatus of claim 23, further comprising:

means for finding an edge having a greatest weight;

means for identifying two nodes bounding said edge as Node1 and Node2;

means for deleting said edge in said graph if both Node1 and Node2 are marked as allocated;

means for allocating a node marked as unallocated in a next available location if one of said nodes is marked as allocated and another node is not; and means for marking said node as allocated.

25. The apparatus of claim 24, further comprising:

means for allocating said two storage entities that are represented by Node1 and Node2 in any next available locations; and means for marking both nodes as allocated.

26. The apparatus of claim 25, further comprising:

means for creating a new node Node.New that represents a combination of Node1 and Node2;

means for marking Node.New as being allocated;

for every edge E between Node1 and any other node in said graph, means for:

calling said other node on said edge Node.Other;

creating a new edge between Node.New and Node.Other;

assigning said new edge an initial weight that is a weight of an edge between Node1 and Node.other;

adding said weight to an edge between Node.New and Node.Other if there is an edge between Node2 and Node.other;

deleting said edge between Node1 and Node.Other;

deleting any edge between Node2 and Node.other; and deleting Node1 from said graph; and for every edge E between Node2 and any other node in said graph, means for:

calling said other node on said edge Node.Other;

creating a new edge between Node.New and Node.Other;

assigning said edge weight a weight of said edge between Node2 and Node.other;

deleting said edge between Node2 and Node.Other; and deleting Node2 from said graph.

* * * * *